(12) United States Patent  (10) Patent No.: US 8,087,270 B1
Gruver et al.  (45) Date of Patent: Jan. 3, 2012

(54) ANTI-THEFT DEVICE FOR HELMET

(75) Inventors: Robert W. Gruver, Tulsa, OK (US);
Richard Karry, Tulsa, OK (US)

(73) Assignee: Gruver Enterprises, LLC, Tulsa, OK (US)

( * ) Notice: Subject to any disclaimer, the term of this patent is extended or adjusted under 35 U.S.C. 154(b) by 320 days.

(21) Appl. No.: 12/477,979

(22) Filed: Jun. 4, 2009

(51) Int. Cl.
*E05B 69/00* (2006.01)

(52) U.S. Cl. ............. 70/18; 70/58; 70/59; 70/64; 70/65; 24/298

(58) Field of Classification Search ................ 70/59, 14, 70/18, 30, 49, 58, 63–65; 24/298, 302; 383/117; 206/8, 9; 150/101, 102; 190/101, 102
See application file for complete search history.

(56) References Cited

U.S. PATENT DOCUMENTS

| | | | | |
|---|---|---|---|---|
| 3,531,955 A * | 10/1970 | Fischer et al. | | 70/59 |
| 3,657,774 A * | 4/1972 | Reynolds | | 24/298 |
| 3,762,191 A | 10/1973 | Smith | | |
| 3,798,934 A * | 3/1974 | Wright et al. | | 70/59 |
| 3,831,407 A * | 8/1974 | Coleman | | 2/421 |
| 3,885,674 A * | 5/1975 | Rosenberg et al. | | 211/4 |
| 4,063,637 A | 12/1977 | Danforth | | |
| 4,069,691 A * | 1/1978 | Simpson | | 70/59 |
| 4,263,954 A * | 4/1981 | Dwinell | | 152/222 |
| 4,460,093 A * | 7/1984 | Otema | | 211/4 |
| 4,766,616 A * | 8/1988 | Donahue | | 2/422 |
| 4,986,457 A * | 1/1991 | Faris | | 223/1 |
| 5,070,712 A * | 12/1991 | Fox | | 70/18 |
| 5,181,402 A * | 1/1993 | Faessler et al. | | 70/18 |
| 5,531,364 A | 7/1996 | Buis | | |
| 5,564,129 A | 10/1996 | Ball et al. | | |
| 5,582,043 A * | 12/1996 | McCue et al. | | 70/58 |
| 6,026,662 A * | 2/2000 | Schlipper | | 70/18 |
| 6,116,064 A | 9/2000 | Driscoll | | |
| 6,244,081 B1 * | 6/2001 | Schlipper | | 70/18 |
| 6,550,293 B1 * | 4/2003 | Delegato et al. | | 70/59 |
| 6,698,257 B2 | 3/2004 | Kulas | | |
| 7,069,753 B2 * | 7/2006 | Schlipper | | 70/18 |
| 7,159,423 B1 | 1/2007 | Mrdeza et al. | | |
| 7,913,839 B2 * | 3/2011 | Fawcett et al. | | 206/315.3 |
| 2010/0107705 A1 * | 5/2010 | Dudney | | 70/59 |

\* cited by examiner

*Primary Examiner* — Lloyd Gall
(74) *Attorney, Agent, or Firm* — Molly D. McKay

(57) ABSTRACT

An anti-theft device in the form of a cage created from high security steel cable for use with a motorcycle helmet to secure the helmet to a motorcycle in order to prevent the helmet from being stolen when the helmet is not in use. The cage opens via a draw string type opening to capture the helmet therein and closes to prevent the helmet from being removed from the cage. A closure cable forms the draw string type closure for the cage and has a closure cable loop at each of its free ends so that the closure cable can be wrapped around the motorcycle and the ends secured together with a standard lock to secure the device and the captured helmet to the motorcycle. The device can be folded to store in a small storage space when not in use and the cable may be plastic coated or uncoated.

12 Claims, 3 Drawing Sheets

ANTI-THEFT DEVICE FOR HELMET

BACKGROUND OF THE INVENTION

1. Field of the Invention

The present invention relates to a device for use with a helmet, such as a motorcycle helmet, to positively lock the helmet to an object, such as a motorcycle, to prevent the helmet from being stolen. The device is a flexible cage made from high security steel cable that opens to admit the helmet to be captured therein and closes around the helmet to secure the helmet within the cage. A closure cable provided on the device opens and closes the cage and, when used in conjunction with a lock, serves as a means for securing the cage and helmet to the motorcycle.

2. Description of the Related Art

Motorcyclists are required in many states to wear safety helmets when riding their bikes. Even in states where helmets are not required by law, it is still desirable from a safety standpoint to wear a helmet whenever the operator is riding. These helmets are quite expensive to purchase. Even the lower priced helmets can easily cost several hundred dollars. Thus, these helmets are a desirable target for thieves who like to steal them off of motorcycles when the motorcycle owner is not around. Because the helmets are bulky, it is not always convenient to carry it into restaurants or other places where the owner may be going on his bike. The only other choice is to leave the helmet with the bike when the owner arrives at his destination. Also, because of the size and shape of the helmets, they are not easily secured to the motorcycle. Thus, often a bike owner will simply hang their helmet unsecured on the handlebars of the bike when they park the bike for a short time, making them easily stolen. What is needed is a small, packable device that can be used to quickly secure the helmet to the bike so that it is not easily stolen off of the bike.

The present invention addresses this problem by providing a device in the form of a cage made from high security steel cable that opens to admit the helmet to be captured therein and closes around the helmet to secure the helmet within the cage. The device has a closure cable which allows the cage to be opened and closed for the purpose of admitting or removing a helmet from the device. The closure cable is provided with a pair of closure cable loops, with one closure cable loop provided at each end of the closure cable so that the closure cable can be used with a standard lock to secure the device and the captured helmet to the motorcycle, thereby making it difficult to steal the helmet.

The cable from which the device is constructed allows the device to be folded down into a small space for storage when not in use and because the cable is high security steel cable, it is difficult to cut with bolt cutter or similar other cutting devices.

SUMMARY OF THE INVENTION

The present invention is a device for use with a helmet, such as a motorcycle helmet, to prevent the helmet from being stolen when the helmet is not in use. The device functions to capture the helmet and secure it to a large object, such as a motorcycle, from which it would be difficult to steal. The device is a cage made from high security steel cable that opens to admit the helmet to be captured therein and closes around the helmet to secure the helmet within the cage. A closure cable provided on the device functions to open and close the cage in a manner similar to a draw string closure. A closure cable loop is provided at each end of the closure cable so that the closure cable can be used with a standard lock to secure the device and the captured helmet to an object. Because of its construction, the device is highly portable. The cable from which the device is constructed is flexible and allows the device to be folded into a small storage space when not in use. The cable may be plastic coated or uncoated.

DETAILED DESCRIPTION OF THE PREFERRED EMBODIMENT

Figure 1:
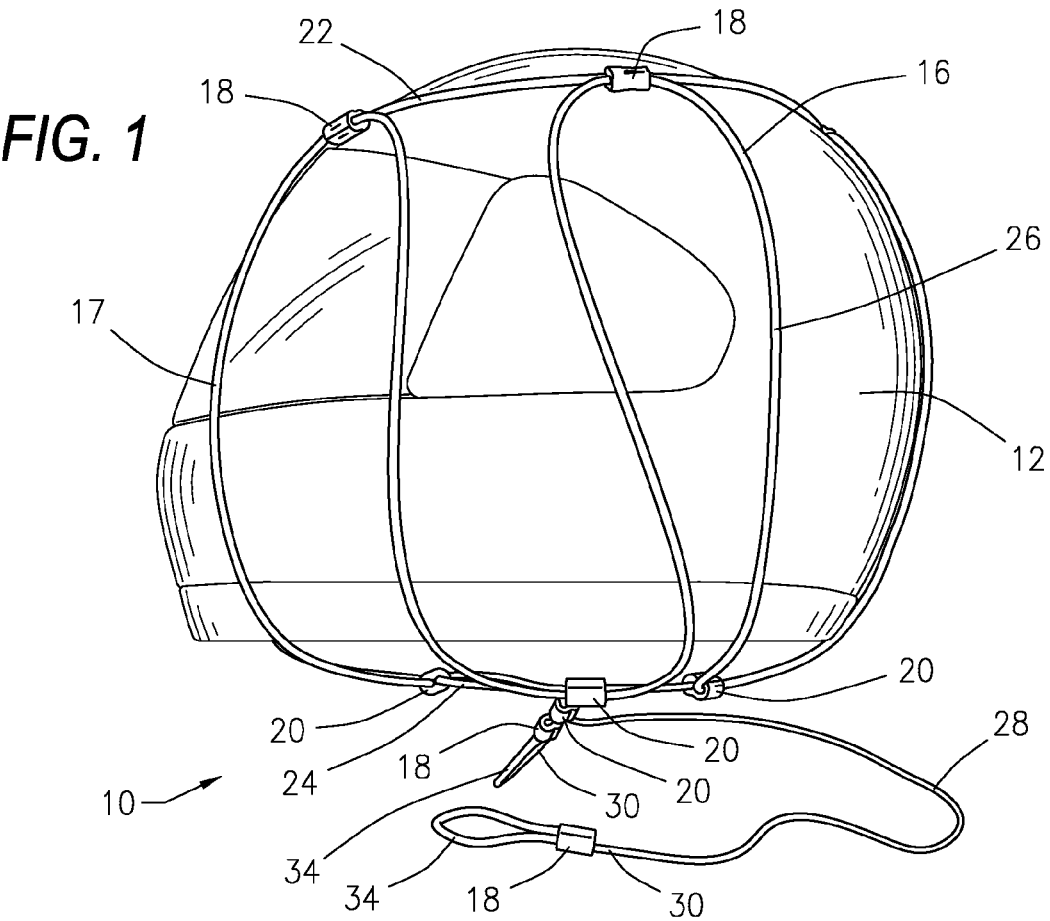
FIG. 1 is a left side view of an anti-theft device for a helmet constructed in accordance with a preferred embodiment of the present invention show secured around a helmet.
Figure 2:
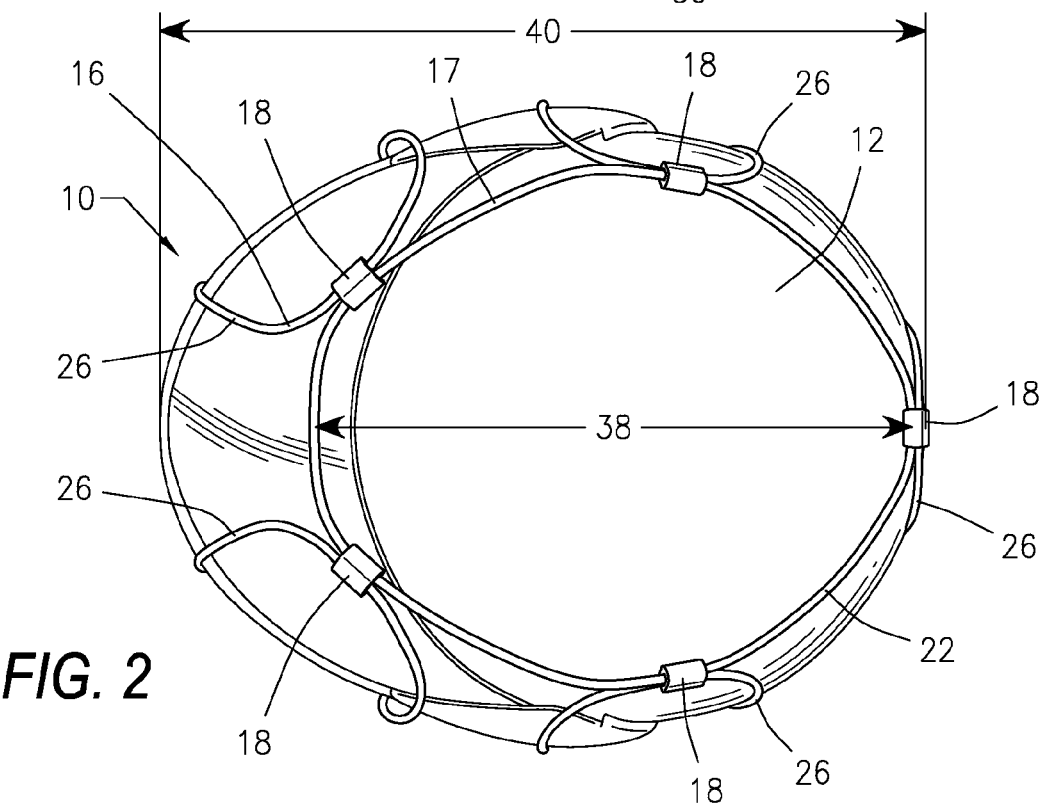
FIG. 2 is a top plan view of the anti-theft device of FIG. 1 shown secured around the helmet.

Referring now to the drawings and initially to FIGS. 1-4, there is shown an anti-theft device 10 for a helmet 12 constructed in accordance with a preferred embodiment of the present invention. As shown in FIG. 5, the device 10 is used to secure a helmet 12, such as a motorcycle helmet 12, to a large or immovable object 14, such as a motorcycle, to prevent the helmet 12 from being stolen when the helmet 12 is not in use. The device 10 functions to capture the helmet 12 and secure it to the object 14 from which it would be difficult to steal the helmet 12.

The device 10 is a cage or cage structure 16 formed from high security steel cable 17 secured together with two types of fasteners, i.e. positive fasteners 18 and movable fasteners 20. The cage 16 is constructed of a top loop 22, a bottom loop 24 and a plurality of side cables 26. Each side cable 26 is fixed attached via positive fasteners 18 to the top loop 22 and is movably attached via movable fasteners 20 to the bottom loop 24. Each side cable 26 attaches to the top loop 22 at spaced apart intervals. Also, each side cable 26 is movably attached to the bottom loop 24 in spaced apart intervals. A closure cable 28 forms the bottom loop 24. The closure cable 28 is movably secured to itself via a movable fastener 20 so as to form the bottom loop 24. The two ends 30 of the closure cable 28 extend beyond the bottom loop 24. Because the closure cable 28 is movably secured to itself to form the bottom loop 24, this allows the bottom loop 24 to be increased or decreased in diameter 32 simply by sliding more or less of the closure cable 28 through the movable fastener 20 that secures it to itself to form the bottom loop 24.

Figure 3:
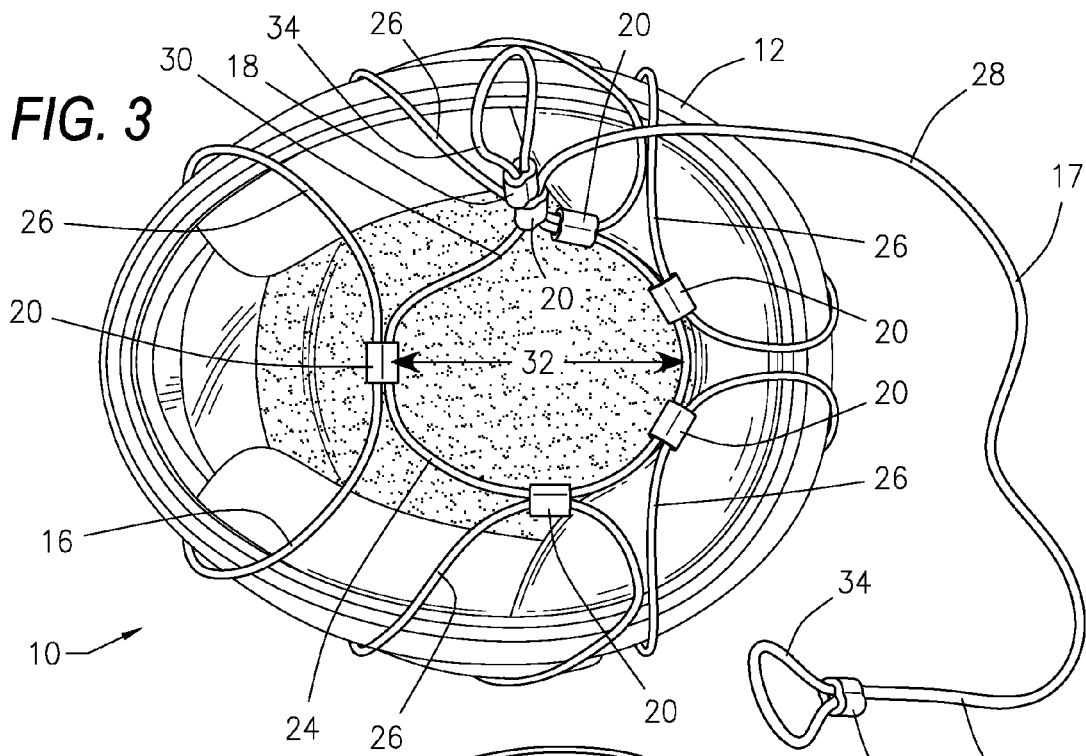
FIG. 3 is a bottom plan view of the anti-theft device of FIG. 1 shown secured around the helmet.
Figure 4:
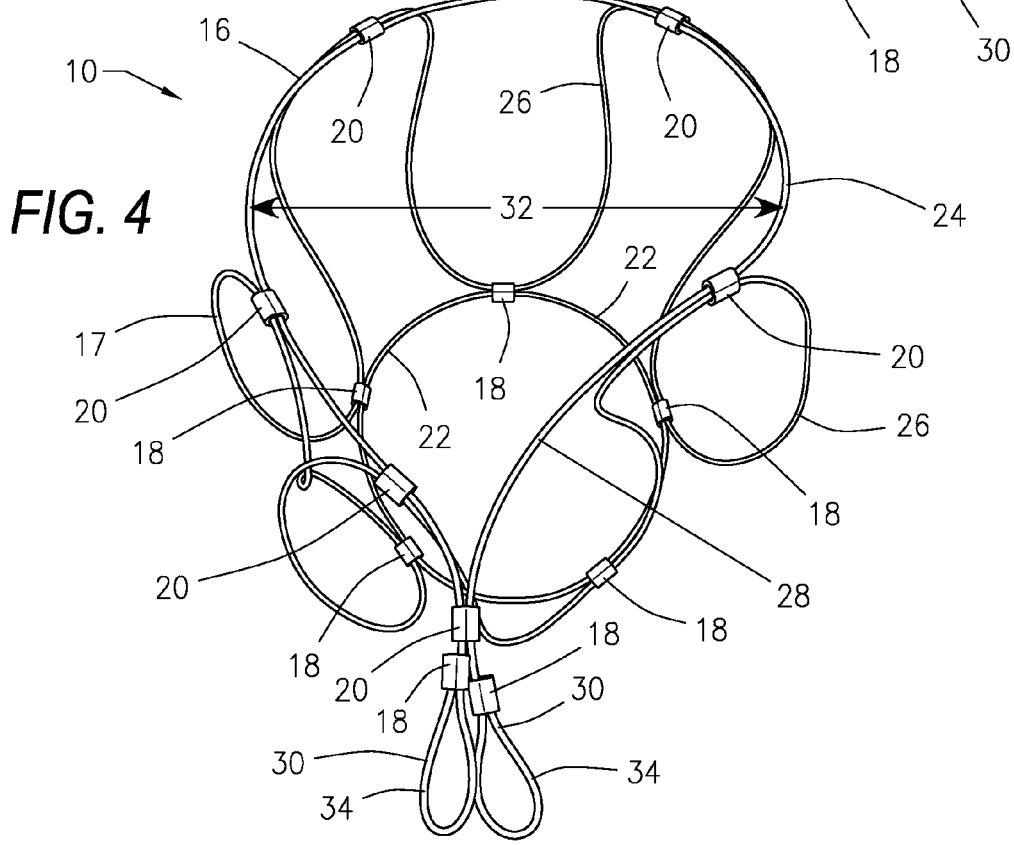
FIG. 4 is a bottom perspective view of the anti-theft device of FIG. 1 shown removed from the helmet.
Figure 5:
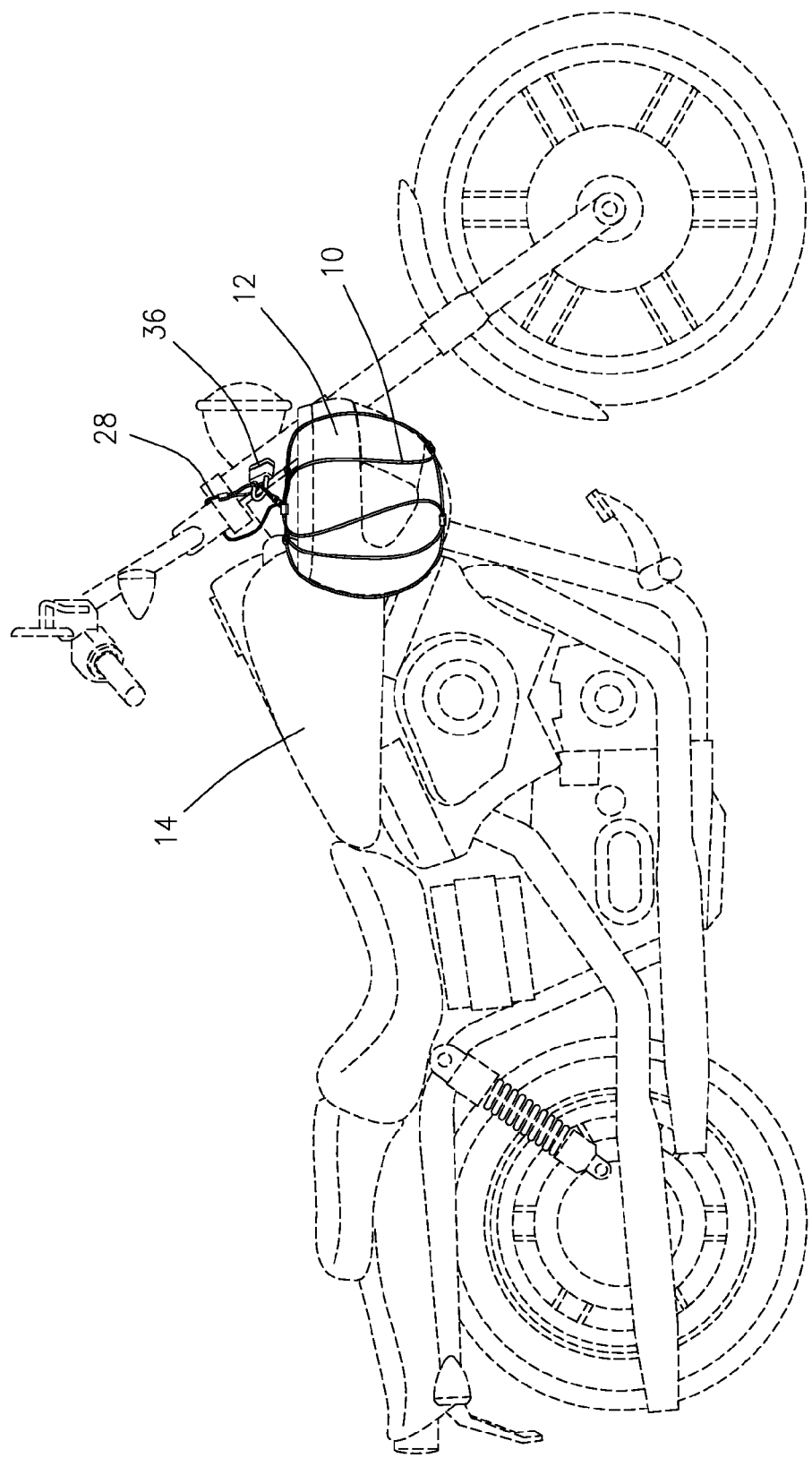
FIG. 5 is a perspective view of the anti-theft device of FIG. 1 shown in use attaching a helmet to a motorcycle.

Referring now to FIGS. 3 and 4, the closure cable 28 functions as the bottom loop 24 and allows the cage 16 to be opened or closed at the bottom loop 24 in a manner similar to a draw string closure. When ends 30 of the closure cable 28 are pulled so as to decrease the diameter 32 of the bottom loop 24, the side cables 26 are moved closer together in spacing on the closure cable 28, thereby closing the cage 16 at the bottom loop 24. When the ends 30 of the closure cable 28 are released so as to increase the diameter 32 of the bottom loop 24, the side cables 26 are free to move further apart in spacing on the closure cable 28 and the cage 16 is opened at the bottom loop 24. The cage 16 opens via the bottom loop 24 to permit the helmet 12 to be placed in the cage 16. The bottom loop 24 is cinched together to close the cage 16 around the helmet 12 to capture the helmet 12 within the cage 16.

A closure cable loop 34 is provided at each end 30 of the closure cable 28 so that the closure cable 28 can be used with a standard lock 36 to secure the device 10 and the captured helmet 12 to the object 14. The closure cable loops 34 may be created by securing the closure cable 28 to itself via positive fasteners 18. Once the cage 16 is thus closed around the helmet 12 to capture it therein and the ends 30 of the closure cable 28 are wrapped around the object 14 and locked in place by the lock 36, this secures the helmet 12 to the object 14 by preventing the cage 16 from being reopened.

To release the helmet 12 from the object 14 and from the cage 16, the lock 36 must be removed from the closure cable loops 34 on the ends of the closure cable 28 to release the closure cable 28 from the object 14 and to open the bottom loop 24 of the cage 16.

Once the cage 16 is closed around the helmet 12, the helmet 12 cannot be removed from the cage 16 until the cage 16 is once again opened via the bottom loop 24. The spacing, size and number of side cables 26 are such that the helmet 12 cannot be removed from the cage 16 via the side cables 26. Preferably at least four or five side cables 26 are employed for each device 10, although the number of side cables 26 may vary.

Also, the top loop 22 has a diameter 38 that is less than a diameter 40 of the helmet 12, and the top loop 22 is secured together by a positive fastener 18 that prevents the top loop 22 from changing its diameter 40, thereby effectively preventing the helmet 12 from being removed from the cage 16 via the top loop 22.

In constructing the cage 16, the top loop 22 may be made of a single piece of cable 17 that has its ends secured together with a positive fastener 18 and the side cables 26 then would be made of one or more separate pieces of cable 17 that would likewise have their ends fastened together with one or more positive fasteners 18. Alternately, the top loop 22 and all of the side cables 26 may be made of a single piece of cable 17 that has its ends secured together with a positive fastener 18.

Because of its construction, the device 10 is highly portable. The high security steel cable 17 from which the device 10 is constructed is flexible and allows the device 10 to be folded into a small storage space when not in use. The cable 17 used in constructing the device 10 may be plastic coated or may be uncoated.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A helmet and anti-theft device assembly for securing a helmet to an object such as a motorcycle or other similar vehicle comprising:
    a helmet, said helmet removably surrounded by a cage, the cage formed from high security steel cable secured together with fasteners, said cage formed from a top loop and a bottom loop that are attached to each other by a plurality of side cables,
    each said side cable fixedly attached to the top loop at spaced apart intervals and movably attached to the bottom loop at spaced apart intervals so as to form the cage around the helmet,
    said bottom loop formed from a closure cable that is slidably fastened together so that the bottom loop is of adjustable diameter and serves as a draw string type closure for the cage via which the helmet can be removably inserted into the cage,
    ends of the closure cable extending beyond the bottom loop and capable of being reversibly cinched together to close the cage around the helmet in order to capture the helmet within the cage, and
    means for locking the ends of the closure cable to an object so that the cage and helmet cannot be detached from the object by an unauthorized person.

2. An assembly according to claim 1 wherein said means for locking the ends of the closure cable to an object further comprises:
    a closure cable loop provided at each end of the closure cable, a lock securing said closure cable loops together after the ends of the closure cable have been wrapped around the object to which is to be secured.

3. An assembly according to claim 1 wherein spacing, size and number of side cables are such that the helmet cannot be removed from the cage via the side cables.

4. An assembly according to claim 3 wherein at least four side cables are employed.

5. An assembly according to claim 3 wherein said top loop is of a fixed diameter that is less than a diameter of the helmet such that the helmet cannot be removed from the cage via the top loop.

6. An assembly according to claim 1 wherein the high security steel cable from which the cage is constructed is flexible and allows the device to be folded into a small storage space when not in use.

7. An assembly according to claim 1 wherein the cable from which the cage is constructed is plastic coated.

8. An assembly according to claim 1 wherein the cable from which the cage is constructed is uncoated.

9. An assembly according to claim 1 further comprising:
    positive fasteners fixedly securing the top loop together and securing the side cables to the top loop.

10. An assembly according to claim 9 further comprising:
    fasteners slidably securing the bottom loop together and fasteners slidably securing the side cables to the bottom loop.

11. An assembly according to claim 10 further comprising:
    one or more positive fasteners securing together the opposite ends of each cable forming the top loop and the side cables.

12. A helmet and anti-theft device assembly for securing a helmet to an object such as a motorcycle or other similar vehicle comprising:
    a helmet,
    a flexible cover adapted to surround or provide a container for the helmet, the cover comprising of cable formed into a netting container, said container having an opening formed by an expandable bottom loop that engages side cables of the netting and opens to allow the helmet to be placed within the container, said expandable bottom loop serving as a draw line for closing the container around the helmet by drawing and moving the side cables inwardly towards each other and reducing the circumferential size of the opening to close off the opening of the cover,
    a locking mechanism arranged to act on the bottom loop to prevent opening of the cover to thereby retain the helmet within the cover, and
    means for securing the cover to an object on which the helmet is to be retained.

\* \* \* \* \*